(12) United States Patent
Raskob et al.

(10) Patent No.: US 11,995,886 B2
(45) Date of Patent: May 28, 2024

(54) LARGE-SCALE ENVIRONMENT-MODELING WITH GEOMETRIC OPTIMIZATION

(71) Applicant: Applied Research Associates, Inc., Albuquerque, NM (US)

(72) Inventors: Benjamin L. Raskob, Albuquerque, NM (US); Nicholas A. Maxwell, Albuquerque, NM (US); Steven Craig Stutts, Albuquerque, NM (US); John-Richard Papadakis, Albuquerque, NM (US); Graham Rhodes, Albuquerque, NM (US); Chris W. Driscoll, Albuquerque, NM (US); Alberico Menozzi, Albuquerque, NM (US); Michael C. Tarnowski, Albuquerque, NM (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 17/892,592

(22) Filed: Aug. 22, 2022

(65) Prior Publication Data

US 2022/0398805 A1 Dec. 15, 2022

Related U.S. Application Data

(63) Continuation of application No. 16/695,981, filed on Nov. 26, 2019, now Pat. No. 11,423,610.

(51) Int. Cl.
*G06V 20/10* (2022.01)
*G06F 18/24* (2023.01)
(Continued)

(52) U.S. Cl.
CPC ............ *G06V 20/176* (2022.01); *G06F 18/24* (2023.01); *G06N 3/02* (2013.01); *G06T 17/05* (2013.01);
(Continued)

(58) Field of Classification Search
CPC .... G06V 20/176; G06V 10/25; G06V 10/764; G06V 10/806; G06V 20/188;
(Continued)

(56) References Cited

U.S. PATENT DOCUMENTS 11,600,042 B2 3/2023 Yngesjö et al.
2008/0050009 A1* 2/2008 Maruya ..................... G06T 7/55
382/144

(Continued)

OTHER PUBLICATIONS

Zhou et al. ("Rectification with Intersecting Optical Axes for Stereoscopic Visualization") IEEE Xplore, Sep. 18, 2006. (Year: 2006).*

*Primary Examiner* — Sing-Wai Wu
*Assistant Examiner* — Khoa Vu
(74) *Attorney, Agent, or Firm* — Erise IP, P.A.

(57) ABSTRACT

Embodiments of the invention provide systems and methods of generating a complete and accurate geometrically optimized environment. Stereo pair images depicting an environment are selected from a plurality of images to generate a Digital Surface Model (DSM). Characteristics of objects in the environment are determined and identified. The geometry of the objects may be determined and fit with polygons and textured facades. By determining the objects, the geometry, and the material from original satellite imagery and from a DSM created from the matching stereo pair point clouds, a complete and accurate geometrically optimized environment is created.

20 Claims, 12 Drawing Sheets

(51) Int. Cl.
  *G06N 3/02*        (2006.01)
  *G06T 17/05*       (2011.01)
  *G06V 10/25*       (2022.01)
  *G06V 10/764*      (2022.01)
  *G06V 10/80*       (2022.01)
(52) U.S. Cl.
  CPC ............ *G06V 10/25* (2022.01); *G06V 10/764* (2022.01); *G06V 10/806* (2022.01); *G06V 20/188* (2022.01)
(58) Field of Classification Search
  CPC ......... G06F 18/24; G06F 18/253; G06N 3/02; G06N 3/045; G06N 3/047; G06N 3/08; G06T 17/05; G06T 2207/10032; G06T 2207/30184; G06T 7/564; G06T 2207/20084
  See application file for complete search history.

(56) References Cited

U.S. PATENT DOCUMENTS

| | | | |
|---|---|---|---|
| 2009/0273601 A1* | 11/2009 | Kim | G01C 21/3638 345/419 |
| 2019/0147619 A1* | 5/2019 | Goldman | G01B 11/03 382/154 |
| 2019/0158011 A1* | 5/2019 | West | G06N 20/20 |
| 2019/0206044 A1* | 7/2019 | Marra | G08G 5/0034 |
| 2019/0304168 A1* | 10/2019 | Korb | G06V 10/60 |
| 2021/0120433 A1* | 4/2021 | Furuichi | H04L 5/14 |
| 2022/0004762 A1* | 1/2022 | Kottenstette | G06V 10/764 |

\* cited by examiner

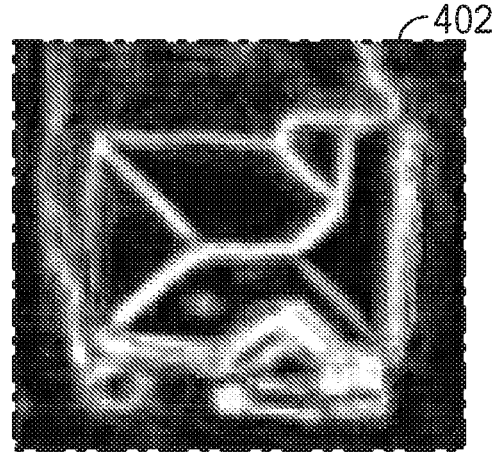
Edge Image Aggregated from Original Satellite Images
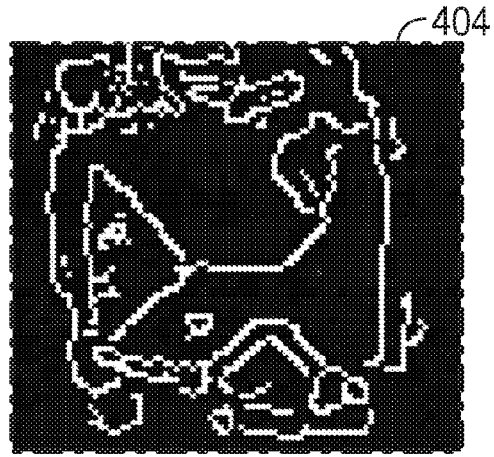
Edge Image Computed from Pan Ortho Image
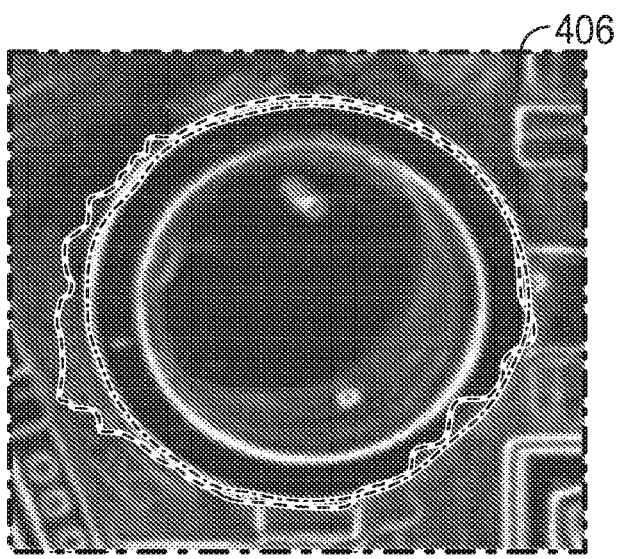
FIG. 4

LARGE-SCALE ENVIRONMENT-MODELING WITH GEOMETRIC OPTIMIZATION

RELATED APPLICATIONS

This patent application is a continuation application claiming priority benefit, with regard to all common subject matter, of U.S. patent application Ser. No. 16/695,981, filed Nov. 26, 2019, and entitled "LARGE-SCALE ENVIRONMENT-MODELING WITH GEOMETRIC OPTIMIZATION" ("the '981 application"). The identified earlier-filed patent applications are hereby incorporated by reference in their entirety into the present application.

BACKGROUND

1. Field

Embodiments of the invention generally relate to environment modeling. More specifically, embodiments of the invention relate to generating complete and accurate low-data, three-dimensional environment models.

2. Related Art

Current methods of satellite- and aerial-based imaging utilize high-resolution images to create a high-density mesh to generate models of objects in the images. Typically, the model created is simply a mesh and there is no information relating to or indicative of the objects depicted. For example, there are no buildings, trees, rivers, lakes, and houses, there is just simply a mesh representing the environment. This requires large amounts of data, long processing times, and slow generation of the models. Further, the model does not differentiate between the various objects in the environment.

What is needed is techniques for generating accurate and complete high-quality object models from satellite and aerial imagery. In some embodiments, the object models may be optimized by combining multiple stereo images to provide high confidence in recognition of the objects in the images. The images may be panchromatic to enhance the shadows and differing features of the objects in the image. The images may also be multi-spectral and used for material, building, cloud and haze detection, and texturing. In some embodiments, the red, green, and blue bands are used. The detected objects may be further defined by detection and classification of material types such that objects may be better defined and may be masked from designated layers. Structures may be modeled using basic geometric designs such as, for example, extruded polygons or gable roof geons (simple building blocks of an enclosed gable roof with height). Further, building façades may be generated based on the detected outer surfaces of the buildings to generate high-quality visual buildings that use relatively low data as compared to the current modeling techniques. Models may be created for terrain, buildings, vegetation, roadways, water bodies, and any other natural or man-made objects in the images. This provides geometrically-optimized low-data models that have quick processing times that may be used in real-time modeling and visualization.

SUMMARY

Embodiments of the invention solve the above-mentioned problems by providing a system and method of generating a geometrically-optimized low-data environment model. A first embodiment is directed to one or more non-transitory computer-readable media storing computer-executable instructions that, when executed by a processor, perform a method of creating an accurate and complete geometrically optimized environment model, the method comprising the steps of obtaining a plurality of images, wherein the plurality of images depict an environment, recognizing an object in at least one image of the plurality of images, determining at least one shape based at least in part on a fitting quality determined between the at least one shape and a geometry of the object in the at least one image, determining that the at least one shape has a highest fitting quality of a plurality of candidate shapes, and generating a model of the object comprising the at least one shape.

A second embodiment is directed to a method of creating an accurate and complete geometrically optimized environment model, the method comprising the steps of obtaining a plurality of images from a satellite, recognizing an object in at least one image of the plurality of images, comparing at least one shape with a geometry of the object, determining a fitting quality between the at least one shape and the geometry of the object, and generating a model of the object comprising the at least one shape, wherein the at least one shape comprises at least one polygon.

A third embodiment is directed to a method of creating an accurate and complete environmental model from a plurality of images, the method comprising the steps of, obtaining the plurality of images, recognizing at least one building in the plurality of images, determining a first height associated with the at least one building from a digital surface model, determining a first shape of the at least one building at the first height, determining a second height associated with the at least one building, determining a second shape of the at least one building at the second height, and combining the first shape and the second shape to generate a geometric model of the building.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein:

FIG. 4 depicts an exemplary embodiment of a process of edge detection;

Figure 1:
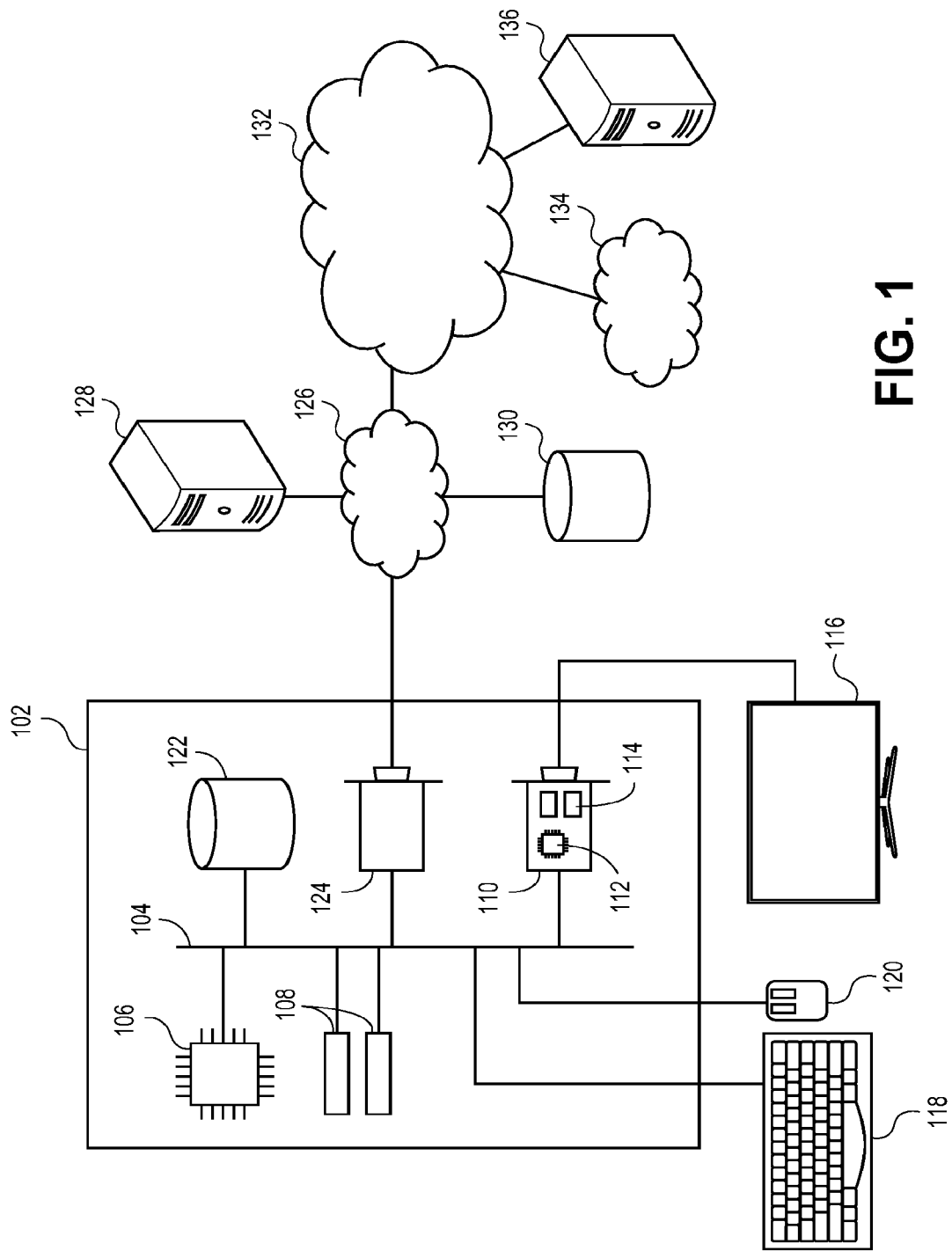
FIG. 1 depicts an embodiment of a hardware system for implementing embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the art by providing a method and system for building a geometrically optimized environment model from satellite and aerial images. Satellite and aerial images may be paired in stereo pairs such that each individual image may not be required to produce large amounts of points for a point cloud Digital Surface Model (DSM). The stereo pair may be selected based on certain characteristics such as sun angle, shading, satellite location and time, and any other characteristics that may be known. The known characteristics may be corrected to align the images such that the stereo pairs have very little error between the image pair. The point cloud images may be fused to generate the DSM.

In some embodiments, the DSM along with the original satellite imagery, orthorectified images, and panchromatic images, as well as information such as material classifications may be used to further determine environmental information such as vegetation, building shapes, roof shapes, and façades, of the buildings. The environmental information may be used to fit polygons, original satellite façades, and synthetic building façades to generate an accurate and complete model of the imaged environment. The generated environmental model may be lower data than existing models providing shortened processing times. In some embodiments, the environmental model may be accessed and generated on a mobile device in real time.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, an application for generating the environmental model may run on the computer 102 and the computer 128 which, in some embodiments, may be mobile devices or may be accessed via mobile devices and run in a web-based environment from a web browser of a user. The web-based environment may store data such that it is not required for the mobile device or computer to have downloaded and stored large amounts of data for the application. Transmitters and receivers may be associated with any devices as described above for transferring data and communication. The application may access data such as object databases, user profiles, information related to other users, financial information, third-party financial institutions, third-party vendors, social media, or any other online service or website that is available over the Internet.

Figure 2:
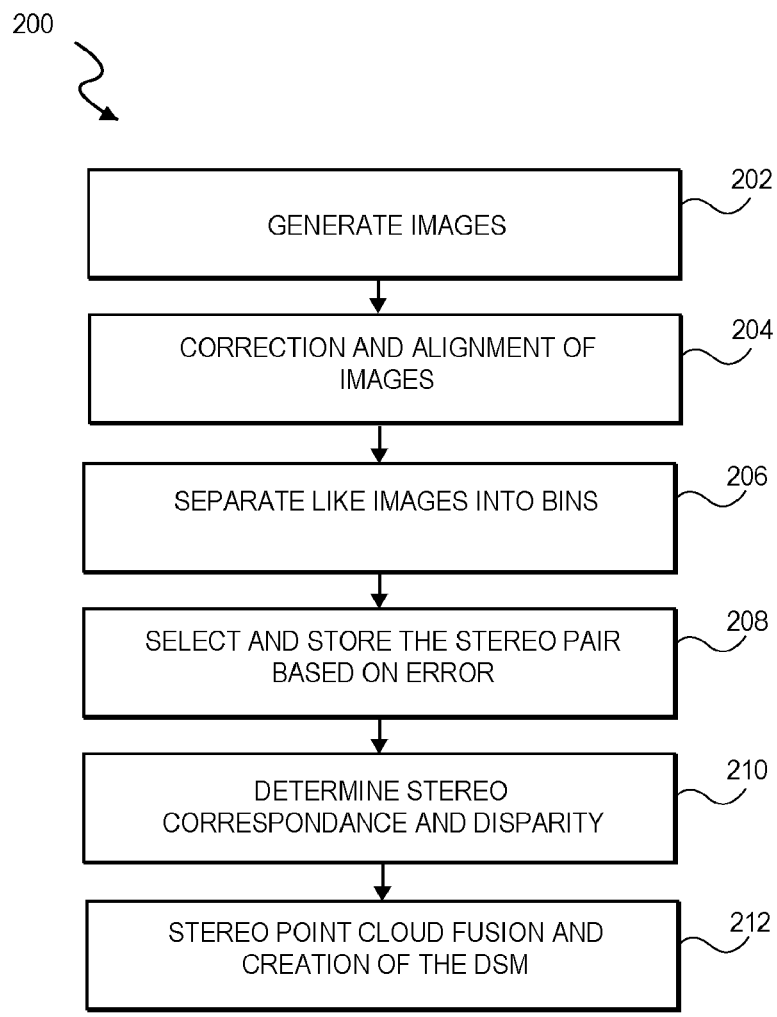
FIG. 2 depicts an embodiment of a flow diagram for generating a Digital Surface Model (DSM)

FIG. 2, generally referred to be reference numeral 200, presents a flow diagram of a process of generating a Digital Surface Model (DSM) from satellite imagery utilizing stereo pairs of images. The stereo pair selection process described herein allows for high-fidelity DSMs to be generated while processing fewer stereo point clouds. The stereo pairs of point clouds can be determined by utilizing information about the original satellite images such as camera positions, image content, and satellite data as well as image and satellite metadata.

In some embodiments, the input imagery is obtained from satellite imagery or from an aircraft, either manned or unmanned, that obtains images from above the ground. In some embodiments, the images be combined from multiple sources. The images may be taken as using light of any spectrum or Light Detection and Ranging (LiDAR). Any information associated with the images may be stored along with the images for analysis such as camera information, location, time, or any other information that may be necessary in embodiments described below. The LiDAR may be used to create point cloud representations of the images.

At step 202, the images are generated from sources such as satellite cameras or cameras mounted on aerial vehicles. Camera parameters may be used to adjust images to match to other images to create stereo pairs. The camera parameters may be, for example, resolution, focus, location, orientation, lighting, and any other parameters that may be useful in embodiment described herein. The camera parameters as well as the location and time of the image and the image content may be stored such that the information may be compared between images. In some embodiments, the Region of Interest (ROI) is selected from images and converted to, for example, top of atmosphere reflectance, an orthorectified image, a panchromatic image, and other corrections of the image that may be useful and discussed in detail below.

In some embodiments, a plurality of bins may be created for storing images with like properties or characteristics. For example, metadata associated with two images may indicate time and location of a satellite as well as the satellite orientation at the time the two images were taken. From the metadata information and information obtained from the images it is determined that the sun angle is similar in the two images. The two images may be placed in the same bin for comparison to determine if the images may meet the requirements of and be selected as a stereo pair.

At step 204, the images and the information from the camera and the satellite data, such as metadata, is used to determine the sun angle differences and the intersection angle in the images. This image information can be determined from the satellite data, the image content, the location and direction of the satellite, and other information such as the sun angle. In some embodiments, the intersection angle may be a measure of how far apart the views are as measured by the angle between the rays defining the optical axis of each view. The incidence angle may be a measure of how off-nadir the image pairs are as an average elevation angle of the views from the satellite. The sun angle difference may be a measure of the illumination change for the pair or a measure of the sun vector of each view. The differences in these categories create errors between each image. The images with the lowest errors may be used to remove errors associated with each image themselves in order to create high quality images with reduced error.

In some embodiments, the images may then be corrected, or aligned, by using a nonlinear optimization comparing common feature points in the images. The images may be aligned by aligning these common feature points. In some embodiments, the images may be aligned using a z-alignment. Because the images are taken from above, and in the case of a satellite, from a great distance, a small horizontal positional error in the image may be approximated by a small change in vertical distance after stereo triangulation. Therefore, a small adjustment in the z-direction, or vertically, may align the points of interest described above. This small correction may bring the stereo pair into alignment such that the point clouds of each image pair may be compared and statistical analysis performed to determine point inliers and point outliers.

At step 206, the information obtained in steps 202 and 204 may be used to categorize the images and place like images in bins. For example, all images of a location may be placed in a bin for comparison. The images may further be narrowed by comparing the location of the camera that captured the image. All images captured from a satellite within a specified area of the sky are placed into a bin. The images may further be narrowed by selecting only images obtained at a particular time. This further narrows the lighting and shading in the images as the sun may be from the same, or a similar, direction, or angle. The images may further be narrowed by comparing any other parameters of the images. For example, the images may be compared for similar shading patterns and similar parallax angles. Using like images will result in similar corrections and more reliable results. For example, the best stereo pairs of images may be pairs of images with the least amount of differences, or error between the images. In some embodiments, the closer the original images are, the less error the stereo pair will have. Combining the like images or the best stereo pair may result in accurate models with a relatively low number of points in the point cloud models.

At step 208, stereo pairs of images are selected. Continuing with the exemplary embodiments described above, two images from a bin may be compared to determine if the two images are a good fit for further analysis and selection as a stereo pair. Any pair combinations of the images may produce a lowest error and thus may be the best stereo pair for further analysis. As such, error between many image pairs may be determined to select two images with a lowest Root Mean Square Error (RMSE), or similarly, a high matching quality. An RMSE score may be determined for many possible image pairs, characteristics within the images, and based on satellite metadata and the pair with the lowest RMSE or highest quality score selected. The stereo matching process for determining the stereo pair may result in stereo pairs with the lowest RMSE between the pair. The stereo pair produces high-quality point clouds for fusion and creating of the DSM.

At step 210, stereo correspondence is determined. Each image in the stereo pair is analyzed to determine points of interest. The points of interest are then compared to match the images. For example, building detection may be performed in the images and similar buildings in different locations in each image may be used to determine the correspondence between the stereo pair. In some embodiments, the differences are measured to determine the disparity between the images. Certain parameters of the images are evaluated to determine the disparity such as, in the example above, known buildings within the images. Images with similar characteristics, as measured from the image or from metadata included with the image, may be stored together in the image bins. The time difference may be the difference in days of acquisition of the images. The information obtained from the images may further be used in embodiments described below.

At step 212, the stereo point clouds are fused to generate the Digital Surface Model (DSM). Each stereo pair of images produces one point cloud through the stereo matching process. The DSM is generated by taking each stereo pair and combining all the stereo pairs into one height image. The selection of the stereo pairs ensures that only high-quality point clouds are included in the DSM fusion. This selection process allows the system to work with fewer images because the images are higher-quality. Otherwise, more pairs would be needed to average out the errors. Typical systems use many stereo point cloud pairs in the DSM fusion. This makes embodiments described herein more efficient over typical systems. In some embodiments, the point clouds may be taken from the satellite data, radar, LiDAR, scanning laser mapping, stereo photogrammetry, or any other source and may be stored in any point cloud format.

In some embodiments, the DSM is a height map that may be used in the determine the heights of objects along with other classifications such as, for example, material classification, object outline, and object identification. The object identities may be separated such that buildings, vegetation, bare ground, and any other object classifier, such as, for example, street, river, desert, pond, swimming pool, golf course, or any other object can be modeled in the modeling environment as described in embodiments below.

In some embodiments, the DSM may be analyzed to determine outliers and inliers. Points in the point cloud of the fused DSM may be analyzed to determine points that are singular or in small clusters outside of a statistical threshold value. For example, points that lie outside of one or two standard deviations from points in a local region relative to the questionable points may be omitted from the model. Rejection of the outliers and selection of the stereo pair may result in a high level of confidence in the model.

In some embodiments, points in the DSM are determined and inliers are kept and outliers are omitted from the model based on relative location to a local median or local mean. In some embodiments, upper and lower bounds around the median points are made and individual points, points a relative location from the median, or points from one image, are determined to be outliers. In some embodiments, the upper and lower bounds are based on standard deviations from the median point.

Typically, final models are either unstructured meshes or point cloud models. In some cases, the unstructured meshes and point clouds are not suitable for applications as described above. It is desirable to produce crisp building models with minimal complexity suitable for modeling and simulation. In some cases, the point cloud models, and DSM, may be used with panchromatic and multi-spectral images to detect objects and classification of objects in the images. Further, images of particular objects, such as buildings, may be taken from multiple satellites and multiple locations to construct three-dimensional views of the objects. Building models that use relatively low amounts of data but provide high-quality visual objects may be generated for real-time use. These models may include crisp building visuals with minimal complexity suitable for modeling and simulation with low data processing. In some embodiments, the building models may be generated with true curves, non-flat or geometric roofs, and complicated architectures to show accurate and complete models of the environment. In some embodiments, the application may leverage multiple satellite-based data sources to produce higher-quality models than would be possible from 3D data alone.

In some embodiments, the satellite images may be orthorectified. Images taken from above may inherently have terrain distortions due to uneven terrain and the camera used for the imaging. In satellite imagery, the satellites have a defined path across the sky and, therefore, cannot take images directly above all positions on earth. The camera angle may not be from directly above the image causing the building faces to be shown. Orthorectification of the images may modify the images such that they are shown from above. By this process the true dimensions of objects imaged from above are shown and the relative distances and measurements are accurately represented. Regarding aerial imagery taken with pinhole-type cameras, the center of the image may be directly below the camera while the outer edges of the image are taken at an angle from the camera based on the camera exposure. For example, buildings in the image may provide different angles because the buildings are at different positions relative to the camera. This results in an image that, at the center, shows no vertical walls, but, as the objects within the image are closer to the outer edges of the image, more vertical walls can be seen. Orthorectification corrects this parallax distortion by correcting the angles in the image to show all objects from directly above.

In some embodiments, the satellite imagery may be panchromatic imagery. The panchromatic images may be higher resolution and show sharp contrasts between objects and shading. These sharp contrasts may provide significant detail in object shapes. When the panchromatic images are compared to the DSM, stereo point clouds, multi-spectral images, and any other images, an accurate and complete visual of the environment may be ascertained. Further, the objects in the environment may be identified, classified, and modeled.

Figure 3:
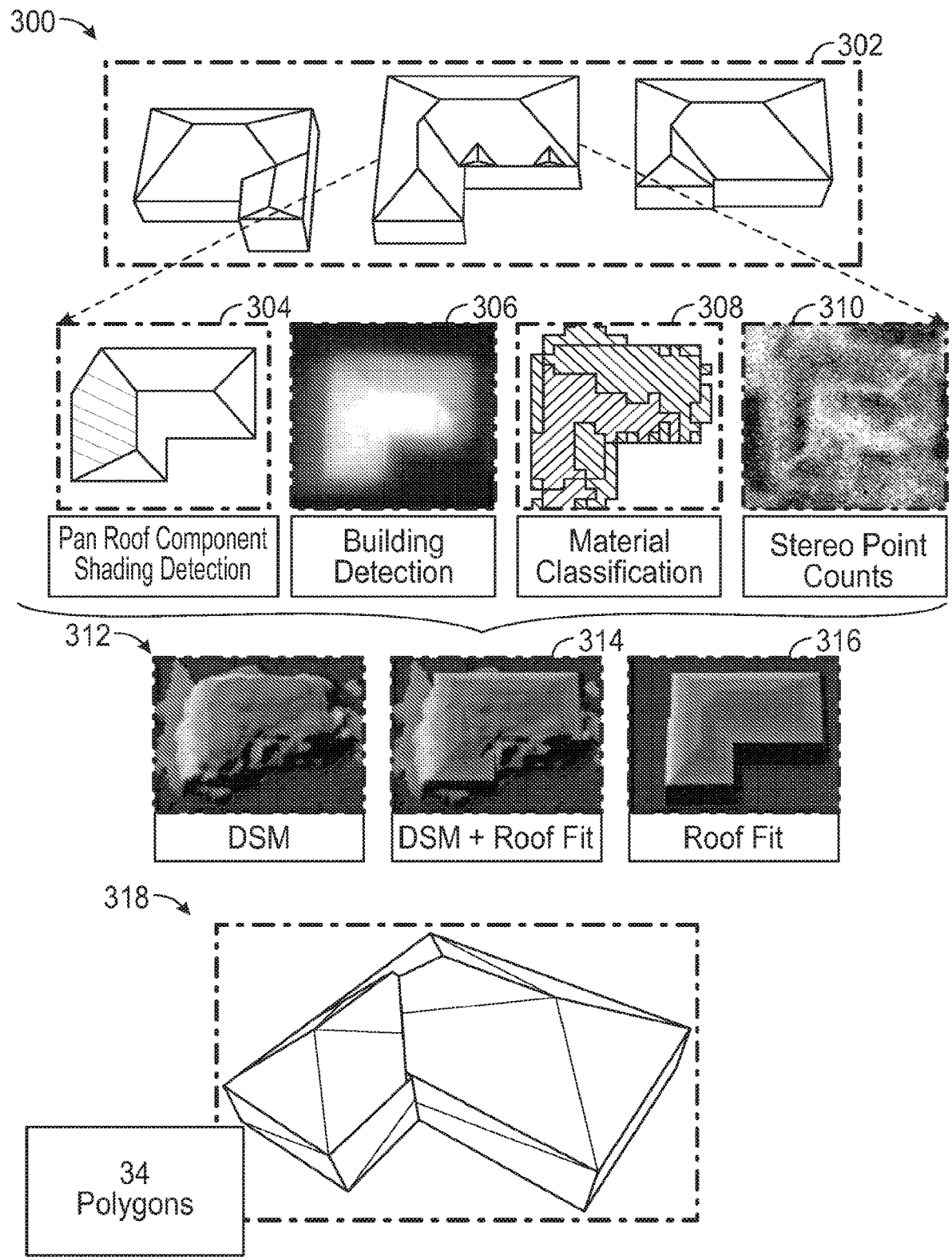
FIG. 3 depicts an exemplary embodiment of a process of roof classification and fitting.

FIG. 3 depicts a schematic of a process of roof determination and matching using a plurality of image and object characteristics generally referenced by numeral 300. Block 302 depicts an exemplary non-orthorectified satellite image of three houses 302. The middle of the three houses is selected for further analysis.

Block 304 presents a shading detection of the roof. In some embodiments, panchromatic imagery may be utilized to detect shading patterns for the roof geometry. The stereo images described above along with satellite metadata associated with the images may be used to detect, or infer, features of the objects in the images. Further, the panchromatic satellite image may be used to determine a building shape and a category to which a building roof may be assigned. As depicted in block 304, a shade side of a roof along with the sun angle may indicate that the roof is a hip roof as depicted. The shading of the roof may be detected using multiple planes of the roof. For example, the hip of the hip roof may have three different shading values. The order of the shading values may be determined by the roof plane position with the sun direction. The plane most facing the sun is the brightest and the plane most facing away is the darkest. The roof components (e.g. hips, gables, and pyramids) may be found using these shading patterns. The roof shape may then be classified as a hip roof based on the shading patterns and a hip roof structure comprising polygons may be fit to the roof.

In some embodiments, the shading of the roof may be used to determine the type of roof as compared to stored roof templates. The images may be matched to templates of roof types. The images may be compared to a roof template library containing many different typical roofs. The roof templates may be constructed of polygons. A plurality of polygons may be arranged to model typical roof types such as the hip roof. Any polygons may be used. As shown in block 318, triangles are used to form the hip roof. However, different polygons such as squares, rectangles, rhombuses or any other shape may be used as well as any other user-defined or machine-learned images as discussed in embodiments below. The templates may be matched to the roof images to determine the classification of the roof. In some embodiments, an algorithm classifies the roof based on the criteria provided above and likewise arrange the polygons to generate the house in block 318.

In some embodiments, a Convolution Shape Dictionary (CSD) algorithm is used to fit flat and non-flat building roof geons to 2.5-dimensional data (DSMs). The algorithm is a greedy iterative approach that performs an efficient global search over geon type and geon parameters, then matches geons to a DSM residual. This is a highly regularized method of fitting geons that uses triangles, boxes, and any other polygon or irregular shape that may be stored and accessed by the algorithm. A vector dictionary is formed by selecting a set of geon types, binding the geon types into a course selection of the geon type two-dimensional properties (e.g. width, length, and radii), and applying a fine set of translations in the two-dimensional space, for example in the x and y directions.

In some embodiments, geon parameter grouping may be performed using the width, length, and height of the determined object. The objects in the image, in this case the house in block 318 is given a width, length, and height. The height parameter fitting is performed using weighted least squares. The height parameter fitting together with the search over translations described above results in a convolution structure such that a Fast convolution Fourier Transform (FFT) may be used to perform the global geon search efficiently. The orientation of the object may be rectified to provide orientation matched geons. Further, the geons may be fit to the two-dimensional parameters by using a dense search.

In some embodiment, the objects may be modeled using a linear combination of the vectors. The geon types from the vector library described above may be added linearly by multiplying each vector of the adjusted geon type by a parameter and adding the vectors. For example, the 2.5-dimensional data may be fit to the three-dimensional geon corresponding three dimensional geon from the vector data. The three-dimensional geons may then be combined to generate the final three-dimensional model.

In some embodiments, the geon candidates may be scored and selected based on a best fit. The scoring model may combine features into a scalar score to determine the best fit model. For example, each model candidate may be compared to the NDSM and the panchromatic image using RMSE. Further, the volume of each model candidate may be compared to an estimated volume and the edge score, semantic building score described below may be used. Further still, an error based on a mean NDSM confidence may be determined. The features may include stereo point count, panchromatic intensity, stereo pair point spread (median and absolute deviation from median) and can be extended. The features are analyzed per-pixel and labels of (0,1) are given. Given the input features, the quality of reconstruction is given as a value between 0 and 1 based on the features present in the reconstruction. The model with the best fit based on this scoring model may be used as the final model.

In some embodiments, the roof may be matched by placing the template over the roof and determining an error associated with the match. The size of the roofs in the templates may be enlarged, shrank, lengthened, or widened based on the size of the objects in the image. Further, each polygon associated with a particular template may be altered to decrease the error between the template and the roof image. The lower the error, the closer the match. The methods for determining error based on shape fitting are discussed in more detail below in regard to FIGS. 5-8.

In some embodiments, at block 306, the building is detected using pan-sharpened multi-spectral imagery. The pan-sharpened multi-spectral imagery is produced from the lower-resolution eight-band multi-spectral imagery combined with the high-resolution panchromatic imagery. The building detection is performed with a deep network, which outputs the building score depicted in block 306. In some embodiments, the edges of the building may be detected from the sharp contrast between the white building and the black ground. The building outline along with the shading from block 304 may provide enough information to determine the building with a high degree of confidence.

In block 308, in some embodiments, the material of the roof may be determined from a material classification algorithm and applied to the building model. The multi-spectral image may be used to determine the material classification. A neural network may be trained to classify materials based on the spectral response of the material. The material response may be the material reflectivity pattern across all eight bands. For example, a plane of the roof may indicate high reflectivity. This high reflectivity pattern across all eight bands of the multi-spectral image may be indicative of a metal and may not be shingle or concrete. The reflectivity may be indicative, for example, of a tin roof. The material of the roof is then classified as tin and a tin is applied to the roof model fit to the recognized roof geometry.

This same function may be performed on a per pixel classification. In some embodiments, the material classification is performed by matching the image, which may be a multi-spectral satellite image, with known material classes.

In some embodiments, the multi-spectral satellite image is an 8-band image including, for example, blue, green, red, yellow, or any array of wavelengths that may provide the best results. In some embodiments, the multi-spectral images may utilize Near Infrared, Mid Infrared, and Far Infrared wavelengths. In some embodiments, the material classification may be generated from imagery utilizing dual-band to 11-band multi-spectral satellite imaging.

Many different types of material classifications may be stored and matched to form the building model. A neural network may utilize many parameters related to the building characteristics. The various building parameters may be included in the training of the neural network. The results may be compared to known materials to provide a high confidence of an accurate match. For example, different variations in materials such as types of concrete, types of wood, types of plastics and siding, as well as atmospheric conditions, sun location and shading, reflectivity, and point location of the point clouds, as well as many others, all may be included in determining the material classification from the imagery. An inexhaustive list of the material classifications may include: no data, vegetation, soil, water, shadow, concrete, asphalt, white polymer, black polymer, glass, solar panel, metal, red ceramic, red paint, blue paint, green paint, gray paint, brown tile, clouds, and any other material type that may be determined and modeled.

Block 310 depicts an orthorectified stereo point cloud image of the roof of the building. In some embodiments, the stereo point clouds and resulting DSM are used to determine the building geometry, roof shape, and height. The points may be analyzed to determine vertical shape and height differences of the roof. The height differences of the roof may be combined with the shading information from the panchromatic image and the material classification to further determine the roof geometry for shape fitting.

At a block 312 the DSM of the building is presented. The DSM may also be used to determine building characteristics and may be used to fit the roof as depicted in block 314. The roof fit along with the DSM shows the relative accuracy and visual simplicity of the model fit roof versus the DSM. Further, the height difference, or height error, of the building fit and the DSM may be determined to fit the best shapes and provide a confidence of the shape fitting. Once the DSM is removed, as depicted in block 316, the roof fit only is displayed. The roof fit is a low-data quick-processing model that is generated quickly and provides an accurate and complete representation of the roof of the house.

Block 318 presents the roof fit and the house model as generated with polygons. When the size and shape of the roof and building are determined, polygons may be fit together to define the size and shape as shown. Different polygon configurations may be fit to define the shape while providing a low error calculation between the polygon fit and the determined size and shape of the roof as compared to the DSM in block 314. The lowest error model may be used, providing a complete and accurate low-data model of the house. In some embodiments, the data required for the house model may further be reduced and the model may be more visually accurate and complete by providing synthetic façades as described in embodiments below.

Again, polygons may be used as many buildings are rectangular and square shaped. The polygons may be match, or fitted, to the images and an error for each determined based on the match. The building detection may be performed using an outline model and histogram recursive modeling described in embodiments below.

FIG. 4 depicts an exemplary process of determining object edges generally referenced by the numeral 400. In some embodiments, a robust edge detection method is implemented to determine edges of objects and structures in the images. Block 402 depicts the aggregation of edge detections from multiple satellite images. Any images obtained from the satellite as well as any images created from the satellite images may be used for building edge detection. Block 404 depicts a single edge detection from the panchromatic orthorectified image for comparison.

In some embodiments, the shading, material classification, building detection, and the DSM of the building along with the parameters such as sun angle, and camera angle provided above may be used to determine the edges. For example, the roof shading in block 304 may be used to determine where the shading begins and where the shading ends to determine the edge of the roof. Further, the sharp color contrast in the panchromatic image of the building detection in block 306 may be used to determine where the white ends and the black ends. This contrast may be used to determine the edge of the building.

Block 406 depicts the edge detection calculated for a circular object. In some embodiments, contour points are overlaid on the image and an error between the points and the recognized shape, as described above, are determined. In some embodiments, active contours hug contour points for shape fitting. The contour points may be laid on the edges. The edges may be determined by any of the above-described methods.

Multiple images may be orthorectified and overlaid and the edge detection performed. Using orthorectified images corrects the error associated with parallax in the images from angles of the satellites. Further, edge detection may be performed on a plurality of images then overlaid for verification or to increase the confidence in the edge detection. The edge detection may be used on the original satellite images, stereo pairs, the panchromatic images, or any other images that may produce comparable results. Combining a plurality of images adds redundancy in the detections, thus increasing confidence in the edge detection result. The edge detection may further be used to score shape fitting described in embodiments below.

Figure 5:
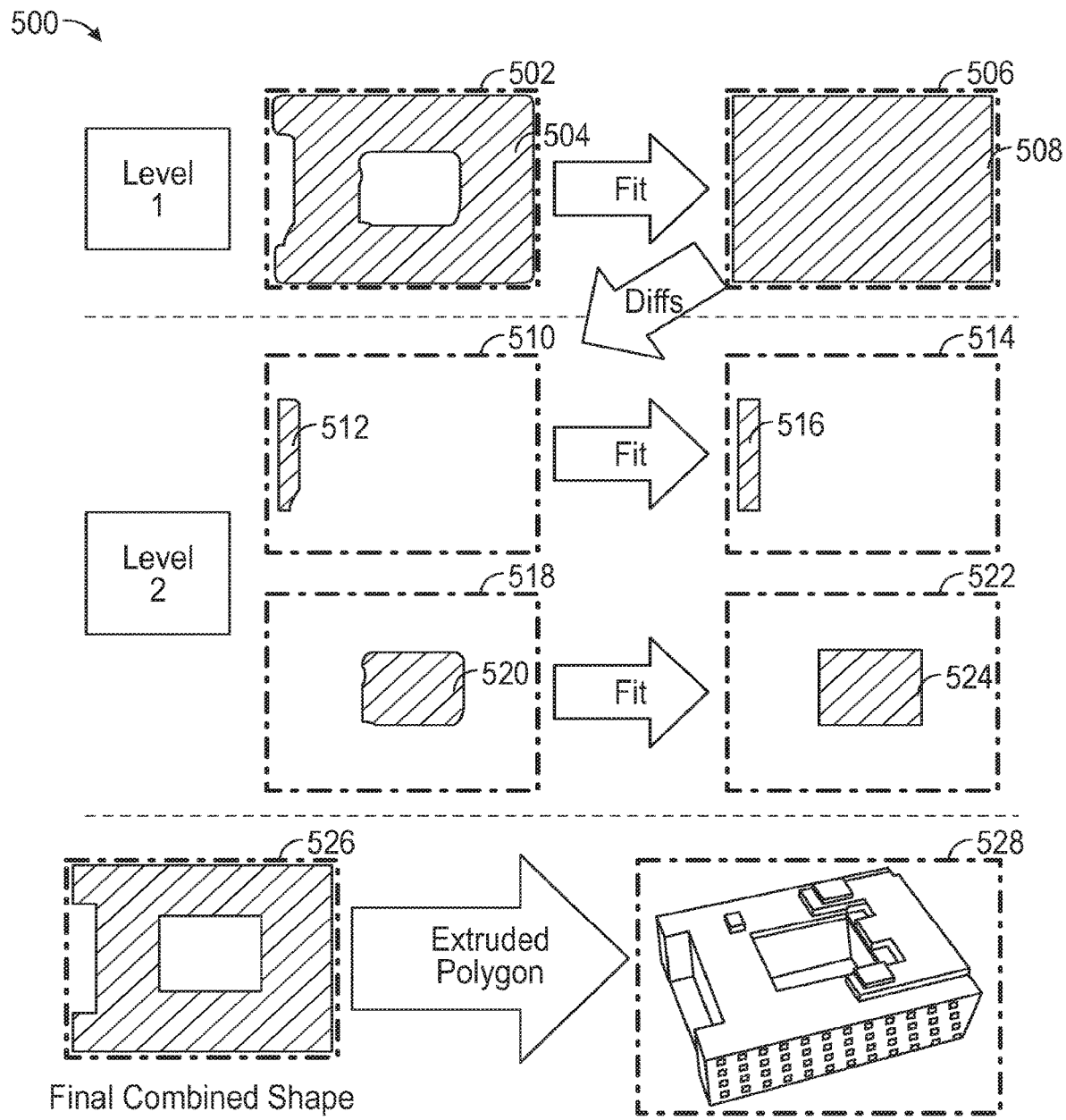
FIG. 5 depicts an exemplary embodiment of a process of recursive fitting models at building height levels.

Turning now to FIG. 5, a schematic depiction of a process of determining building levels is shown and generally referred to by reference numeral 500. A histogram of building heights is created with masking for vegetation and uncertain values. The DSM may be normalized to extract relative elevations from the images. The Normalized Digital Surface Model (NDSM), may be the DSM and a Digital Terrain Model (DTM). The DTM may provide elevation of the terrain in the images. The DTM may be used to normalize the DSM with elevation of the buildings and objects based on a ground level. This provides a reference elevation to define height levels to be analyzed.

In some embodiments, level masks may be created from a flattened NDSM. Each level depicts the information received from that particular level with all other levels masked from the images. In this way each level can be viewed separately. In some embodiments persistent homology may be used to determine the topological features and filter noise in levels from the NDSM.

In some embodiments, assumptions are made and multiple data sources are combined along with the assumptions to recognize and generate preliminary building masks before modeling. First, a pixel-wide probability may be calculated. The pixel-wide probability may define each pixel as a class based on the input data. The input data may be used to classify pixels as "building" starting with class, measurement, and features. For example, based on height differences in the NDSM, pixels may be classified as buildings based on an initial probability. The pixels may be classified as features of the building and may further be classified by specific measurements. For each pixel, given the input data, a probability of the pixel being "building" may be determined. The input data may be obtained from the NDSM, material classification, original satellite imagery, and open source geographic information mapping data. In some embodiments, the material classification may be provided by an aggregation of corresponding ortho-rectified rasters.

In some embodiments, a Linear Spectral Clustering (LSC) algorithm is used to produce superpixel segmentation of the panchromatic sharpened multi-spectral (RGB) image. A graph may be created using the superpixels as nodes, with edges connecting adjacent superpixels. A similarity score between adjacent pixels may be calculated. The superpixel similarity score may be the edge weight. Each node corresponding to a superpixel may be assigned the corresponding superpixel mean probability. Probability flow across the graph may be created and an equilibrium found. This process makes local areas of similar characteristic homogenous.

In some embodiments, the building mask may be computed by hysteresis thresholding. In this case, a low threshold is selected and a high threshold for building probability is selected. For each pixel, if the building probability is greater than the high threshold the mask for that pixel is marked. Further, if the building probability is greater than the low threshold and connected to a pixel with a probability greater than the high threshold, the mask for that pixel is marked. Any probability other than the two conditions described may be marked as no mask. The masks are generated from the marked pixels. The hysteresis thresholding may provide a high confidence for generating the building masks.

In some embodiments, a histogram of height differences from original NDSM compared to the levels of the NDSM is used to detect fine details. Recursively, masks are again created with the fine details from the histogram as described above. Turning to FIG. 5, buildings models are created using a recursive fitting method at each level. At each level, as described below, layers of the building are analyzed. These different building layers may be generated from the level analysis of the NDSM starting with the generated level masks described above. Two dimensional shapes, such as, for example, polygons, may then be fitted to the building layers to create a model of the building based on the different building layers. In some embodiments, the fitted shapes may be compared to the images to determine a fitting error and the shapes with the least error may be selected for modeling.

To provide a starting point, a strong prior assumption is made that buildings have a perpendicular construction. In this way, polygons of different shapes and sizes may be arranged to form many building geometries. Rectangular blocks may be used to model most building shapes. For example, FIG. 5 depicts a level 1 which is the top layer of the detected building as shown in block 502. After the level 1 building shape 504 is determined as described in embodiments above, a shape, in this case a fitted rectangle 508, is fit to the building in block 506. At level 2, a first difference 512 between the detected building shape 504 in level 1 and the fitted rectangle 508 is determined and displayed in block 514. A first rectangle 516 is fit to the first difference 512. An error is determined between the first difference 512 and the first rectangle 516. In some embodiments, the first rectangle 516 is selected based on the error such that it may be polygon that provides the least error when a plurality of shapes are compared to the first difference 512.

Further, a second difference 520 between the building shape 504 and the fitted rectangle 508 is detected and shown in block 518. The second difference 520 is recognized by fitting a second rectangle 524 shown in block 522. An error between the second rectangle 524 and the second difference 520 is determined. The error is compared to other possible shapes and the second rectangle 524 is selected based on having a smallest error. The second rectangle 524 and the first rectangle 516 are subtracted from the fitted rectangle 508 to generate the final combined shape 526. This method is performed for each layer of the building at each determined elevation level. When the shapes are determined each final shape including the final combined shape 528 is extruded to form the building model in block 528.

The building in block 528 includes several other rectangular shapes that may be added and subtracted from the overall building structure using similar methods. At each two-dimensional height level, or layer, the two-dimensional shape of the building is determined and recursively fit by extracting the shapes or adding the shapes to the original shape fit as needed. In some embodiments, the shapes are fit to rasters by combining as vector polygons. Finally, all polygons are extruded to their individual height level, determined from the DSM, to generate the final building model presented in block 528.

The polygons may be modeled such that a low, or a lowest possible, number of polygons are used to generate complete and accurate models while maintaining a level of accuracy of the model. In some embodiments, an accuracy is determined by matching combinations of polygons to the building shape in the images and determining an error between the fitted shape and the object geometry. The accuracy from the compared shapes and the objects in the images may be compared with a lowest threshold of accuracy and only the shapes with an error lower than the determined accuracy threshold may be kept. Further, the shape with the least number of polygons while meeting the accuracy threshold may be selected for the shape fit.

Figure 6:
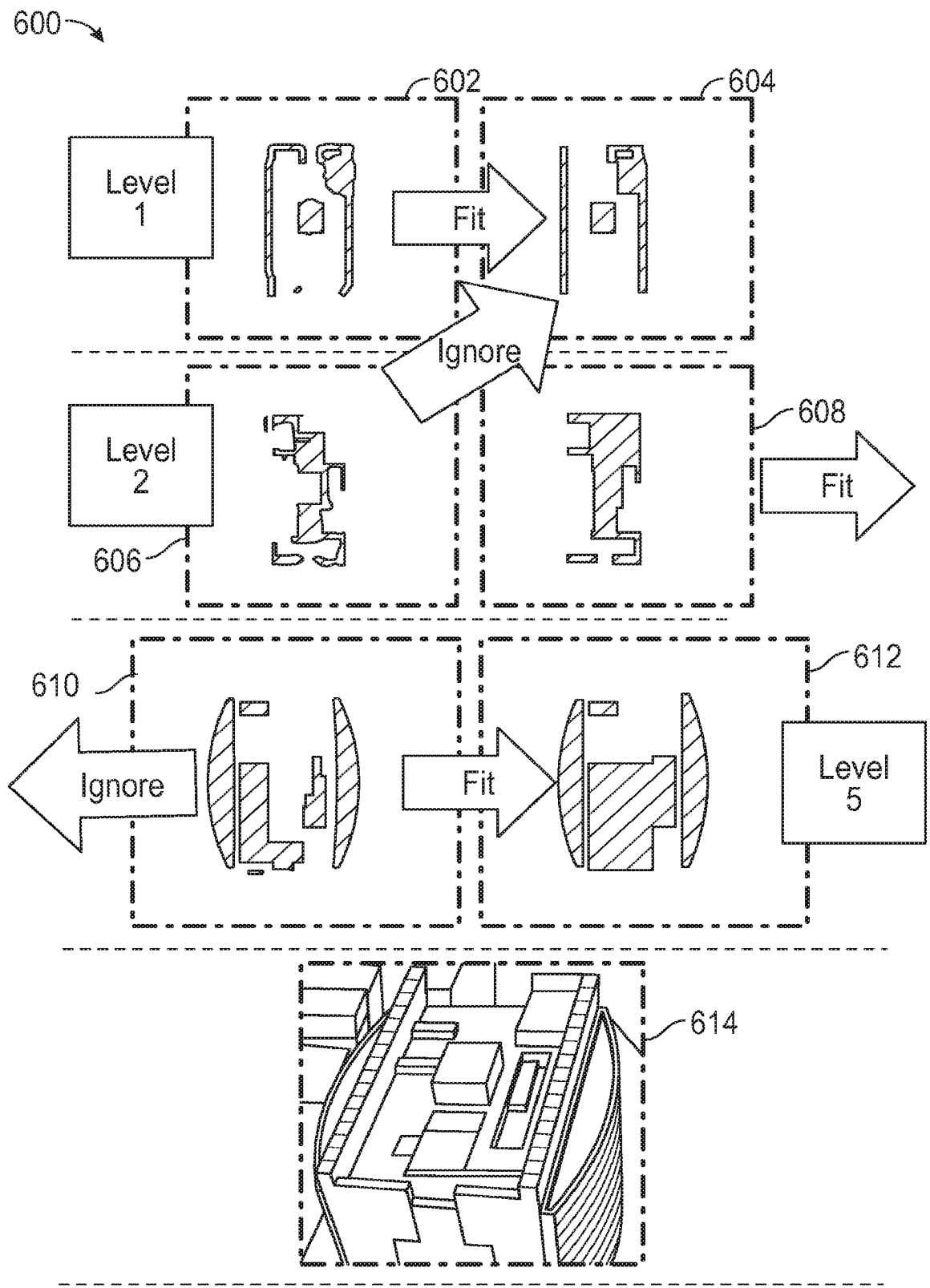
FIG. 6 depicts an exemplary embodiment of a process of top-down layer fitting for building shape fitting.

FIG. 6 presents a schematic depiction of a process of a top-down layer fitting for building modeling generally referenced by the numeral 600. In the top-down layer fitting each layer is analyzed and shape fit independently of the layers above. Block 602 presents level 1 as described herein. Level 1 presents the DSM of the layer of the building detected at the elevation, or normalized height, of level 1 in block 602. Block 604 depicts the polygon fit, as described above, to the DSM image of level 1. Level 2 is constructed ignoring level 1 such that level 1 is essentially re-generated in level 2 as level 1 is above level 2. This procedure continues for all levels such that the levels do not require extrusion as the exemplary recursive fitting presented in FIG. 5. Further, in the top-down method the "ignored" layers are not scored, so the top-down method, in some embodiments, results in more highly scored shape fitting than the recursive method provided above. Block 614 depicts a final rendering of the building using the top-down method for the height of the building regions.

Figure 7:
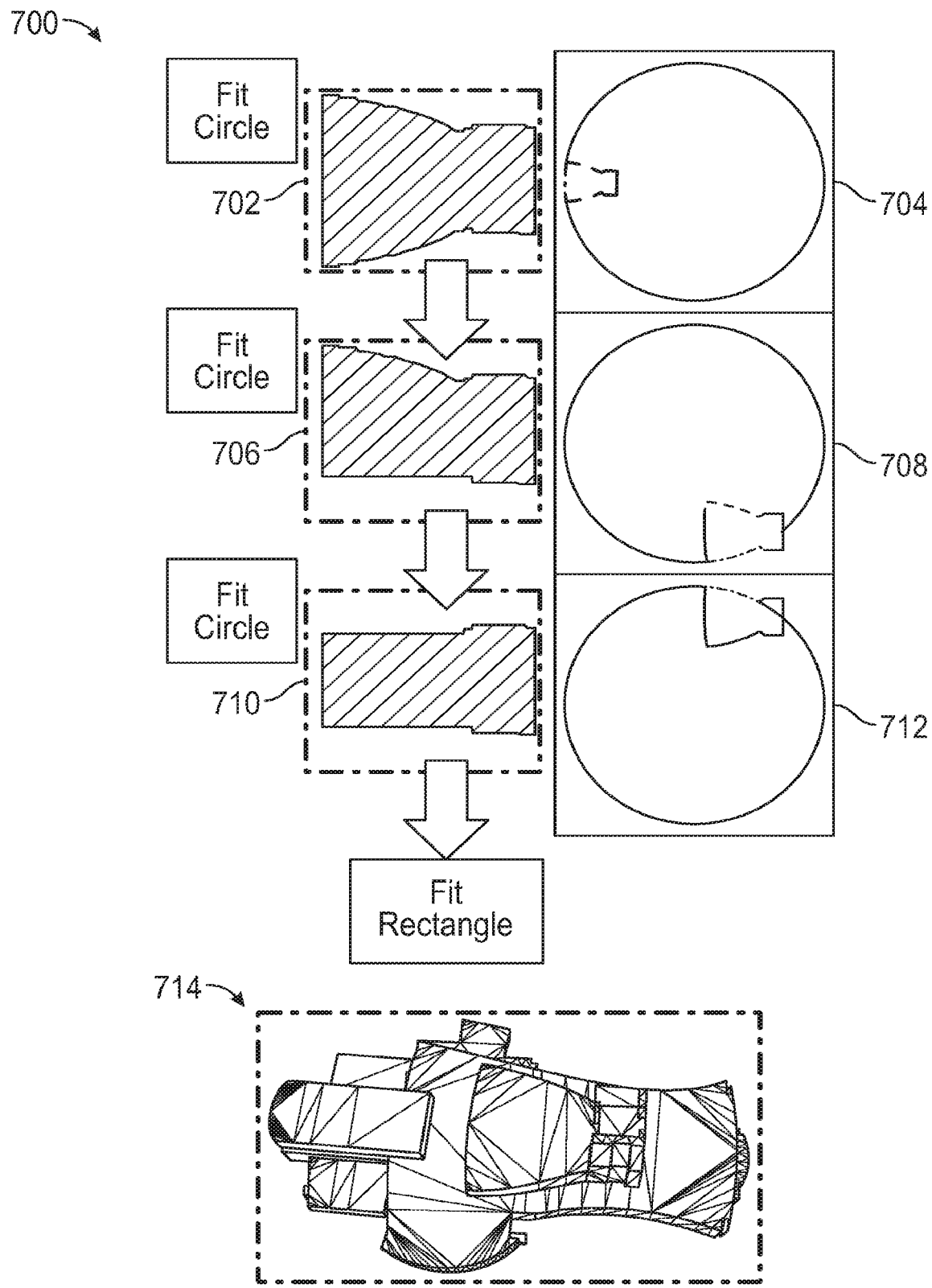
FIG. 7 depicts an exemplary embodiment of a process of fitting circular arcs for building shape fitting.

FIG. 7 depicts a schematic for a process of fitting circular arcs to objects from the satellite imagery generally referenced by the numeral 700. Again, the individual levels are analyzed using either the recursive method or the top-down methods described above. For recognized arcs, circular arcs can be fitted to the recognized building layers. The building section is recognized from the layer and displayed in block

702. A left side of the object is fit to a circle at block 704 and the arc of the circle is stored to represent the model of the building depicted in block 714. Similarly, the arc of the building from the satellite imagery in blocks 706 and 710 are modeled by circular arc fitting in block 708 and 712 respectively. In some embodiments, inliers and outliers from the DSM are determined. Because the edges can be determined and the contours are ordered, no random sampling is necessary. The final model representing the building is displayed in block 714 where many polygons are used to create the building geometry and the arcs.

Figure 8:
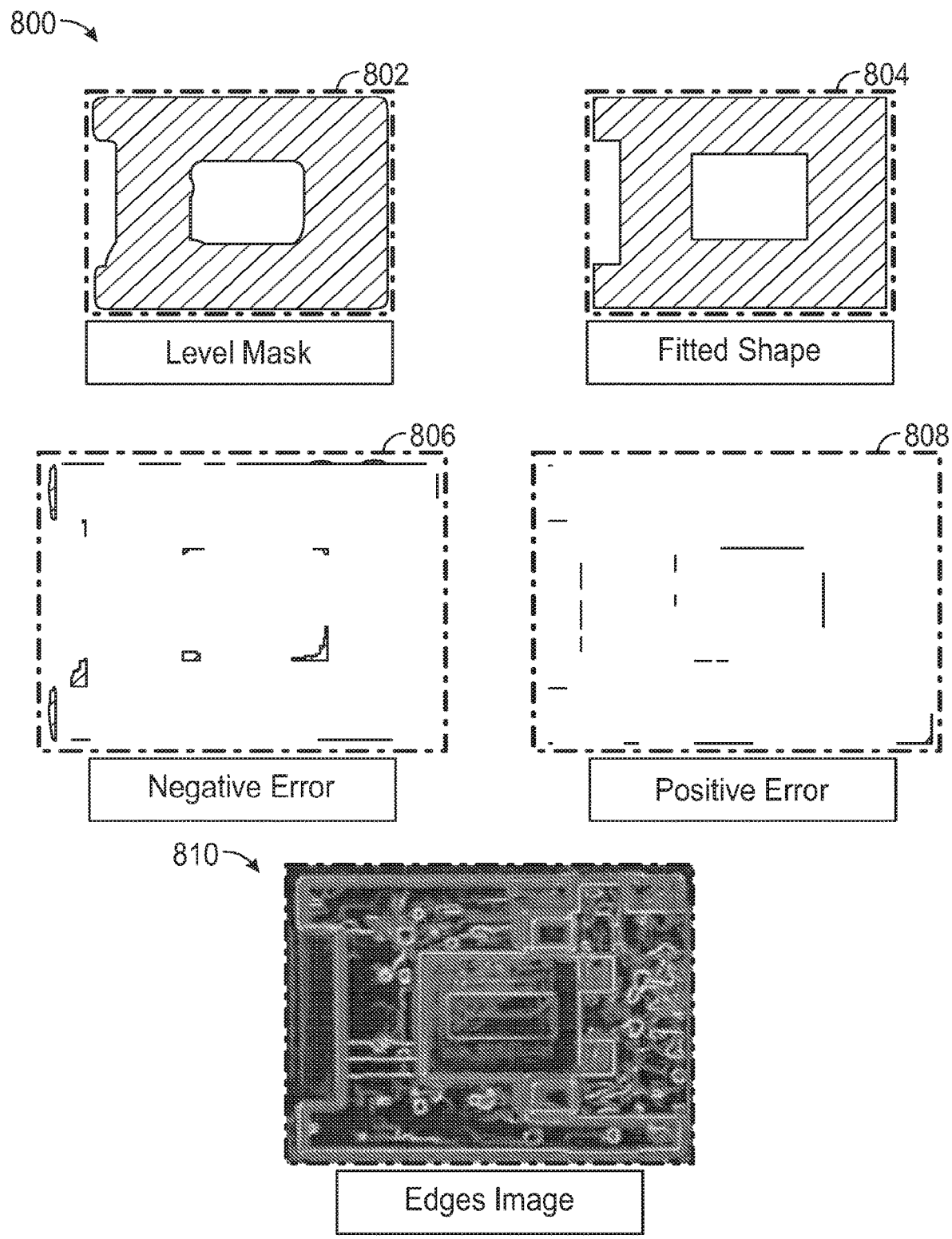
FIG. 8 depicts an exemplary embodiment of a process of shape scoring.

Turning now to FIG. 8, presenting a schematic of a process of scoring the shapes for determination of the best shapes to be included in the model generally referenced by numeral 800. The exemplary shapes are from the recursive fitting described in FIG. 5 above. Block 802 depicts the level mask from the NDSM, and the fitted shape is presented in block 804 and is fitted as described in reference to FIG. 5 above. Where the fitted shape is larger than the level mask the error is labeled as positive error. This is presented in block 808. Where the fitted shape is smaller than the object in the image, the error is labeled as negative error. This is presented in block 806. In some embodiments, the negative error is preferred because it is less desirable to add more to the shapes to obtain an accurate model as in the case of positive error. Because, noise is trimmed back, it is more desirable to have smaller shapes and trim back the noisy edges as in the negative error model.

The block 810 presents an edge detection of a objects in a satellite image that may be used for the error analysis. In some embodiments, the resulting fitted shapes are overlaid on the satellite images to determine a confidence in the building fit. Further, fitted shapes may be compared to the edges generated from the edge detection described above. In some embodiments, the fitted shapes are given a higher score the more closely they match the edge detection. Comparison to the various images provides a higher confidence in the accuracy and completeness of the model. Further still, shapes may be scored based on the number of polygons. The higher the number of polygons the higher the error. These results may be added to a learning algorithm to improve fitting results over time.

In some embodiments, the errors associated with the objects in the environment may be evaluated to determine a fitting quality. The fitting quality may comprise any positive and negative errors associated with the roof fitting, the number of polygons, the positive errors, the negative errors, chipping and segmentation errors as discussed below, or any errors associated with any modeling technique described herein. Further, the fitting quality calculated for each individual component such as a building, the roof of the building, a window of the building, a layer of the building, or the entire environment. In some embodiments, a high fitting quality represents a good match between the model and the environment and, in some embodiments, a low fitting quality represents a good match between the model and the environment.

Figure 9:
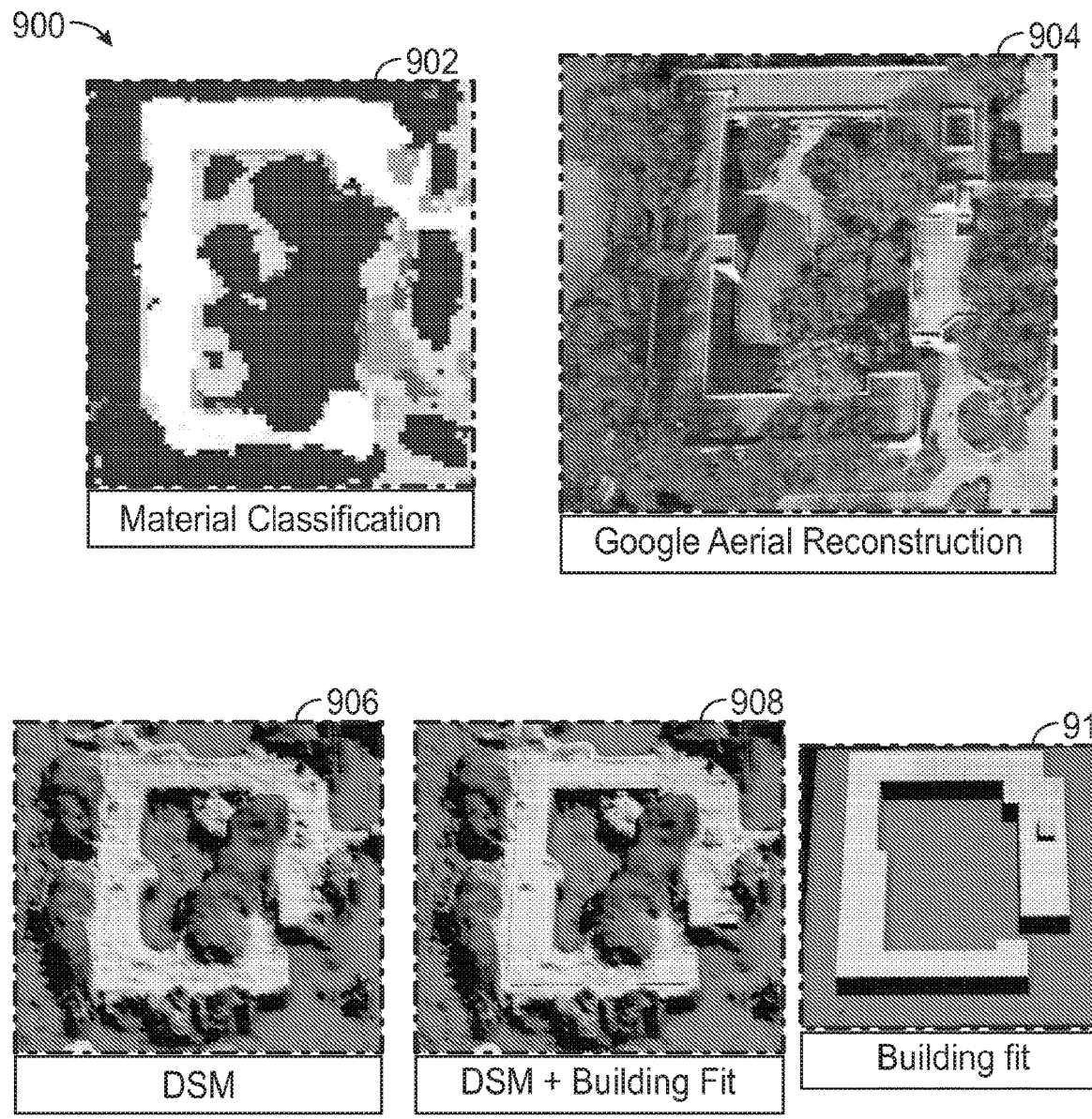
FIG. 9 depicts an exemplary embodiment of a process of shape fitting under vegetation.

FIG. 9 depicts a schematic for a process of completing building models for buildings obscured by vegetation generally referenced by numeral 900. Block 904 depicts a GOOGLE EARTH view of a building with a courtyard and vegetation. The building is obscured by the vegetation in several places. In some embodiments, various models are combined to determine when a building is occluded by vegetation such as, for example, material classification, building detections, and the DSM. As described above, the vegetation may be determined by the material classification and also may be determined by the DSM as shown in block 902. The vegetation may be determined to be above the building such that the building is obscured by the vegetation when the building layers are determined as described in FIGS. 2-8. Analysis of the upper levels show the vegetation may be removed and that the geometry of the building below the vegetation may be assumed. For example, the simplest geometries may be provided to complete the occluded portions of the building. This may start with simple polygons as described for fitting above. The DSM model of the building is provided in block 906 with the vegetation. At block 908, the DSM with the simplest shape fit to complete the building is presented. Finally, in block 910, the building fit model is provided without the DSM showing the occluded regions completed with simple polygons. In the building model the vegetation is removed to show the building. However, in a full rendering of the environment the vegetation may also be modelled and added to complete the environment.

In some embodiments, buildings and objects on hill and mountain slopes may be modeled. Highly sloped regions may be broken up into smaller segmented regions. The building heights may be modeled based on the slope of the terrain. The terrain may be determined and the height of the buildings may be based on expected values. Further, NDSM may not be as trusted as the heights may not be as accurately known. Shape fitting iterations may be reduced to quicken modeling. Large scale clusters of buildings may also be broken into smaller regions by segmenting based on building orientations computed using two-dimensional wavelets. Because, in some cases, the buildings on hillsides may be close together, the relative heights of the structures are visible. Therefore, the sloped roof buildings may be more robustly separated.

Figure 10:
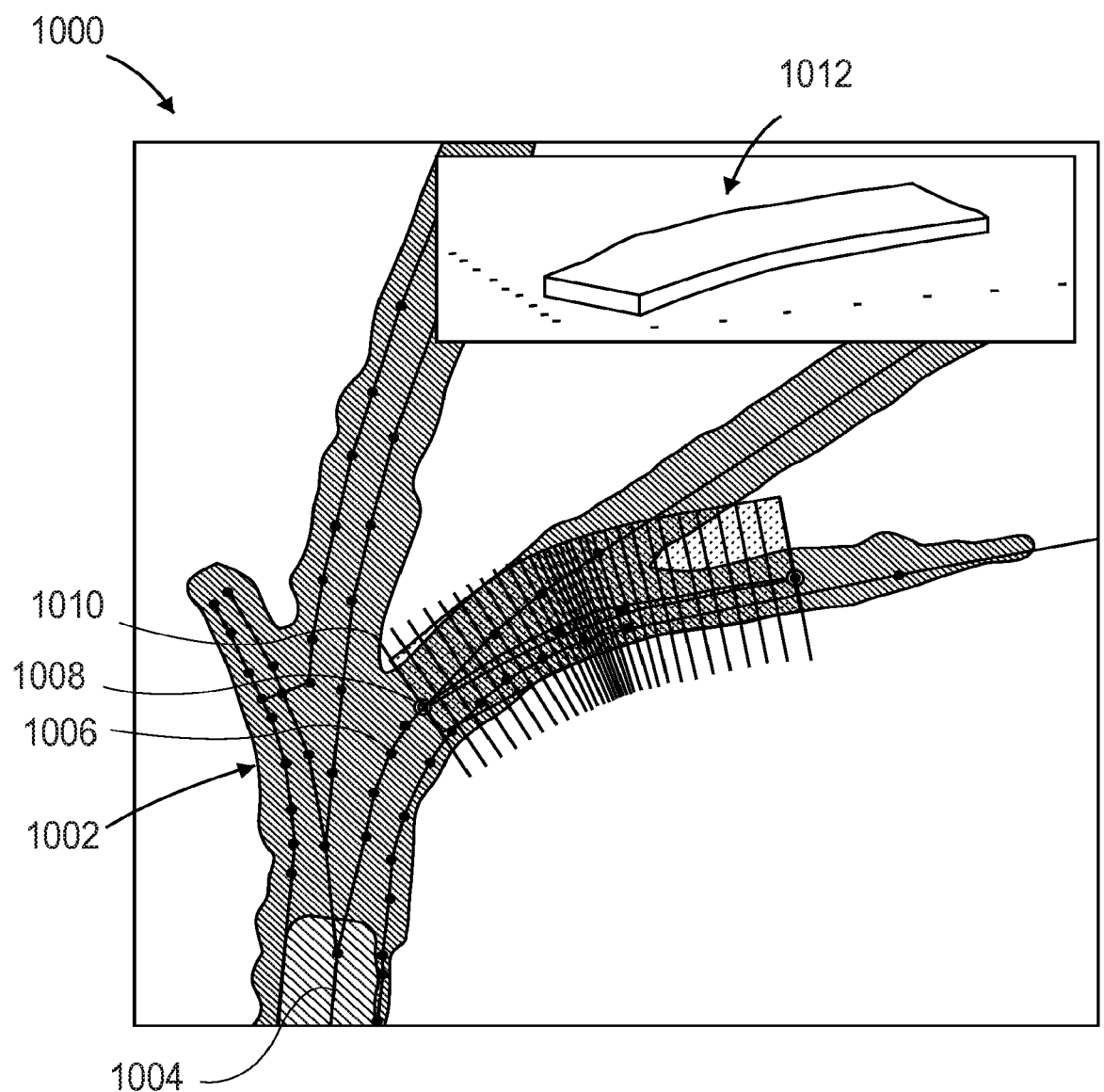
FIG. 10 depicts an exemplary embodiment of a process of generating a bridge and elevated roadway (BER) section.

In some embodiments, represented by the exemplary process in FIG. 10, the NDSM of a geographic area of interest may be combined with other input data such as the material classification image, and open-source street mapping data related to Bridge and Elevated Roadways (BER). In some embodiments, the combined data is used to determine a probabilistic framework to identify among all available, the data corresponding to BER. Further, three dimensional shapes may be fit to the BER data to create the BER models.

In some embodiments, a BER probability image 1000 is created where the value of each pixel corresponds to a probability that the pixel corresponds to BER as determined from the input data described above. Using the BER probability image 1000, three-dimensional shapes are fit to the high probability BER pixels to create the BER model of the bridge or roadway.

In some embodiments, the BER probability image 1000 comprises a detected probability of an elevated roadway 1002, an original centerline 1004, and points 1006 from opensource street data, cross-section reference points 1008, and cross-section search extents 1010. In some embodiments, the NDSM corresponding to high-probability BER pixels is searched along each of the cross-section search extents 1010, and BER cross sections are identified. Smoothness constraints are enforced on the cross sections such that the widths and the heights of adjacent cross sections are similar. The resulting smoothed set is used to generate a corresponding single three-dimensional section shape 1012. In some embodiments, segments are analyzed and determined in areas of interest and each segment is connected to the other segments to create the final three-dimensional BER model.

In some embodiments, synthetic façades are created using an inverse modeling methodology to go from satellite data to synthetic façades and building models. The satellite imagery may be analyzed to determine characteristics of the buildings in the image, as described in embodiments above, and synthetic façades generated based on the characteristics of the buildings in the image.

In some embodiments, a projective satellite textured model is selected for the building façades. A visible portion of the satellite images is projected onto the model. An image is scored based on the direction of the sun with respect to the façade normal as well as the resolution of the satellite image. The known solar position is used to find façades that are facing the sun and façades that are facing away from the sun. The images may be normalized from the shadow side to match the sunny side to correct for shadows. The image may then be textured on the final model.

Figure 11:
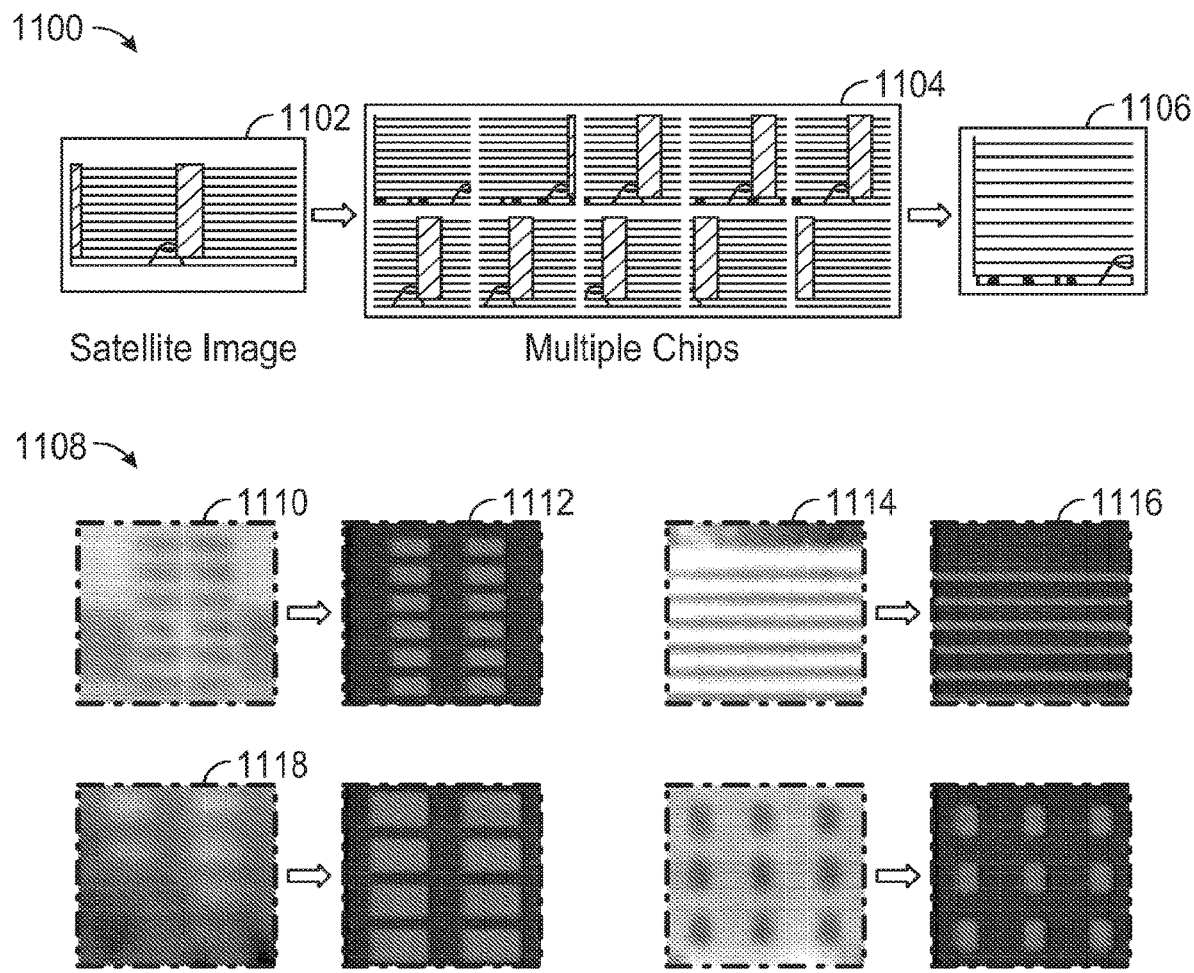
FIG. 11 depicts an exemplary embodiment of a process of generating a building facçade.

FIG. 11 depicts a process of modeling building façades using chips and segmentation generally referenced by numeral 1100. Providing synthetic façades for the buildings provides many benefits. For example, the synthetic façade generates detailed crisp images that are visible at any resolution. The crisp images replace the objects in the satellite image and the DSM such that the synthetic images are clear models of the buildings in the satellite image. Further, the synthetic models may not rely on the image restoration and rational polynomial coefficient orthorectified models presented above. The best, potentially fragmented, observation of each building may be used to obtain façade details and generate the synthetic façade. In some embodiments, this is known as chipping. Further, still, even if the façade is fragmented, the synthetic façade may be generated from a partial observation. This is described in relation to segmentation below.

At step 1102, a new selection is determined from the satellite imagery and the geometry models generated in embodiments described above. The buildings may be scored based on information obtained from the images and the camera. A scoring function may be implemented using an occlusion function, observation angle, and relative weights. For example, $f(x, y)=o(x, y)(w\_1 \, s \, (x, y)+w\_2 \, b(x, y)+w\_3 \cos(\theta))$. The better the imagery the better the model can determine an acceptable synthetic façade.

At step 1104, chipping is performed. In chip extraction, the satellite image may be broken up into portions, or chips, of the building image. Each chip may be analyzed to determine the best representation. The multiple chip analysis depicts a building partially obscured. The selected chip depicted in block 1106 depicts a chip of the building that is not obscured. The selection of this chip provides for a good basis for segmentation as the chip is an accurate representation of the building.

The segmentation, or determination of a best façade, utilizes a trained conditional Generative Adversarial Network (GAN). The trained GAN has a dataset of "good" façade matches for training. Once trained, the algorithm, in some embodiments, a neural network, matches façades to the building images as seen in FIG. 11. For example, the segments provided in blocks 1108 are examples of façades segments match to building chips. Block 1110 depicts a building chip and block 1012 presents a building façade match to the chip with the GAN. Block 1114 depicts a building chip with vertically separated windows and a façade match in block 1116. The blocks 1118 further depict building chips and façade matches from the GAN.

In some embodiments, synthetic roof fitting may be performed as well. A small number of styles of roofs may fit a large number of building roofs because roofs are functional and less about aesthetics. Synthetic roofs may be created and stored and fit to different buildings. In some embodiments, a class of building and a class of roof is determined and these classes are match based on the parameters determined from the imagery and with the polygon fitting described above. For example, the orthorectified roof image, the roof mask may be determined, and the roof edge may be determined as described above. Using multiple images creates redundancy and higher confidence in the synthetic roof shape match. The roof images are used to match to a roof classification and a roof-type classifier. A synthetic roof is then match based on the roof classification and the roof-type classifier and added to the synthetic façade to generate a three-dimensional synthetic model.

In some embodiments, the synthetic roof and the building façade may be textured. A material of the building and the roof may be determined from the material classification neural network described above. Once synthetic façade and a roof is selected based on geometry, the synthetic façade and the synthetic roof may be textured with the material.

In some embodiments, low-rise structures may be generated using the satellite imagery, DSM from stereo pair point clouds, and processes for geometric and material fitting described above. In some embodiments, geometry-image deep-learning infrastructure algorithms may be used to recognize small details in low-rise structures. In some embodiments, ground-based imaging may be used to image low-rise structures as well as any of the environmental objects described above. In the event that the satellite and aerial images may not be used, ground imaging may be implemented to scan the environment such that the images may be added to the system and utilized to generate a complete and accurate geometrically-optimized environment.

Figure 12:
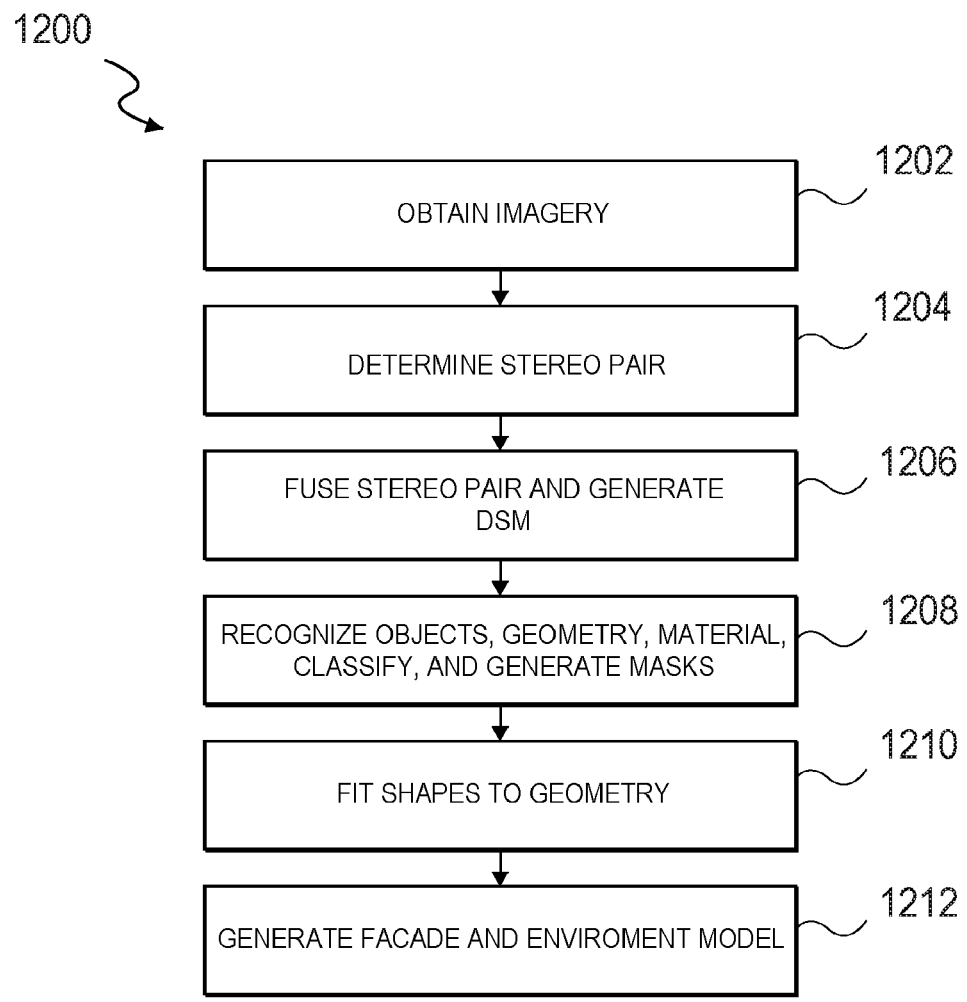
FIG. 12 depicts an exemplary flow diagram of embodiments of the invention of generating an environment model with geometric optimization.

FIG. 12 depicts a flow chart of a method for generating a large-scale environment model with geometric optimization. At step 1202, the imagery utilized for embodiments as described above are obtained. The images may be obtained from satellites, aerial vehicles, or ground-based methods. The images may be panchromatic, multi-spectral, point clouds, or any other imaging that may be useful as described for embodiments above. The images may be generated from radar, LiDAR, infrared, laser, spectral, or any other method of remote sensing. Any sensing characteristics such as camera, sensing methods, locations, and times may be stored for determining parameters to be included in the image analysis. The parameters may be used to determine sun angle, shading, object recognition and classification, material recognition and classification, and geometry recognition and classification.

At step 1204, the stereo point clouds may be determined as described in embodiments above. In some embodiments, the images may be compared to images of like characteristics. For example, images of like regions with similar sun angles and shadows taken from similar or same locations may be grouped. The grouped images may be analyzed in pairs to determine the best pair, or the pair with the least amount of predicted error for a potential stereo point cloud. This may be determined using a model that predicts Root Mean Square Error (RMSE) based on the satellite metadata. The information from the satellite may be satellite pointing vector, time, position, sun position, and any other information that may be useful as described in embodiments above. In some embodiments, the stereo pair is the pair of images with the smallest RMSE.

At step 1206, the stereo pair point clouds are adjusted and fused to generate the Digital Surface Model (DSM) as described above. The stereo pair point clouds may be aligned to further reduce the error between the point clouds. A small amount of adjustment along the z-axis or vertically may align the point clouds. Once the point clouds are aligned, the point clouds may be fused into one DSM. Once the DSM is created inliers and outliers may be accepted and rejected based on a statistical analysis of the points in the point clouds. Outliers may be omitted from the point cloud based on standard deviations from determined medians and means of point cloud data. The selection of the stereo pair, fusion, and outlier rejection creates an accurate DSM with a relatively low number of points that can be analyzed quickly.

At step 1208, objects in the environment are recognized, classified, and the geometry and the material of the objects are recognized and classified as described above. Orthorectified panchromatic and multi-spectral images as well as the DSM may be analyzed to determine roof and building geometries as well as environmental materials. Environmental material classifications may be used to determine the objects in the environment. For example, the material classification algorithm, which in some embodiments, may be a neural network, may determine vegetation for trees covering buildings, concrete for the buildings and sidewalks, and asphalt for a road. Further, the height of the objects is determined from a Normalized DSM (NDSM). The vegetation is higher than the roof of the building and the sidewalk and road are at ground level. The trees, building, sidewalk, and road are all then classified as such from the material and height information. Further, the classification may utilize geometry determined from shading and edge recognition. The geometry and heights of the building may then be model by recursive modeling and top-down layering described above.

Further, building masks may be generated using the NDSM, material classification, original satellite imagery, and open source geographic information mapping data. The plurality of data sources may be fused to create the building mask as a basis for modeling as described in embodiments above. A pixel-wide probability may be determined to produce classes of the pixels. In some embodiments, the NDSM, aggregated building material classification image, the geographic information mapping data, and an aggregated building detection score image are used as measurements to perform Bayesian inference using a probabilistic model to produce a probability of "building" per pixel as described in embodiments above. A probability flow is allowed across a graph-connected superpixel segmentation to make similar regions homogenous. The masks are produced using hysteresis thresholding as described above.

At step 1210, In some embodiments, the buildings and environments may then be modeled using shape fitting and the generated masks as described in embodiments above. The shapes may be polygons and modeled such that a low, or a lowest possible, number of polygons are used to generate complete and accurate models while maintaining a level of accuracy of the model. In some embodiments, a lowest threshold of accuracy is determined by matching combinations of polygons to the building shape in the images and determining an error between the fitted shape and the object geometry. The least number of polygons meeting the accuracy threshold is used for the shape fit.

In some embodiments, the Convolution Shape Dictionary (CSD) algorithm is used to fit flat and non-flat building roof geons to 2.5-dimensional data (DSMs) as described in embodiments above. Height parameters may be fit using linear least squares and, together with search over translations, results in a convolution structure, which allows FFT to perform an efficient global search of geon types. A best geon from a plurality of candidate geons may be selected based on a scoring model that compares the candidate information to image and object characteristic data as described in embodiments above.

In some embodiments, three-dimensional Bridge and Elevated Roadways (BER) are determined using a probabilistic framework to identify data corresponding to (BER) and fit three-dimensional shapes to the BER. Pixels are determined to be high probability BER using NDSM, material classification image, opensource mapping data, and BER tags. Three-dimensional individual shapes are fit to the high-probability pixels and the final three-dimensional model is produced from the union of the individual shapes as described in embodiments above.

At step 1212, a projective satellite textured model is selected for the building façades. A visible portion of the satellite images is projected onto the model. An image is scored based on the direction of the sun with respect to the façade normal as well as the resolution of the satellite image. The known solar position is used to find façades that are facing the sun and façades that are facing away from the sun. The images may be normalized from the shadow side to match the sunny side to correct for shadows. The image may then be textured on the final model. This process is further described with reference to FIG. 9 above.

Further, in some embodiments, synthetic façades may be generated to model the environment as described above. The synthetic façades may be trained from images and stored such that the synthetic façades match with known building exteriors. The building exteriors from the images may be analyzed in sections described as chipping in embodiments above. When the exterior chips are formed, segments of the buildings may be used to match to the synthetic façade that produces the least error between the image chip and the façades. A low data accurate visual model of the building using synthetic façades and synthetic roofs may be generated.

Any of the algorithms performing the processes described above may implement machine learning, neural networks, statistical analysis, statistical modeling, or any other algorithms necessary to perform the processes. The resulting shapes from the shape fitting may be compared to known objects to determine an error and applied to a learning algorithm to improve fitting performance.

In some embodiments, object recognition may determine any object in the imagery such as, for example, trees, grass, lakes, rivers, houses, buildings, streets, benches, or any other objects that may be recognized in the imagery. The material of the objects may be determined to generate the object models that appear with the same or similar appearance. The geometry of the objects may be determined from satellite and aerial imagery and may be two dimensional and three dimensional. The images may be from one source or multiple sources to provide two-dimensional and three-dimensional constructions of the environment. The geometry of the objects may be determined and fit with polygons and geometric façades. By determining the objects, the geometry, and the material from original satellite imagery and from a DSM created from matching stereo pair point clouds, a complete and accurate geometrically optimized environment is created.

In some embodiments, the environment models described herein may be used to display surroundings on a mobile device in real time. For example, a tornado or a hurricane may damage an area and a first responder on the ground may utilize the application to generate images the environment both before and after the disaster. This may provide the first responder a local position recognition and understanding of the buildings and houses that were there in order to quickly look for survivors. This may also be useful to urban and rural firefighters to find safe regions to fight fires and access to buildings. Further, the real-time modeling could be useful for gaming, such as, for example, treasure hunting and geocaching. When traveling, the application can be used to find a hotel and match the exterior of a hole-in-the-wall restaurant that is hard to find. There are many exemplary use cases for the environment modeling described herein.

Although the invention has been described with reference to the embodiments illustrated in the attached drawing figures, it is noted that equivalents may be employed and substitutions made herein without departing from the scope of the invention.

Having thus described various embodiments, what is claimed as new and desired to be protected by Letters Patent includes the following:

1. A method of generating an environment model representative of an environment, the method comprising:
    obtaining a plurality of images of the environment from one or more databases including satellite images;
    storing image characteristics associated with the plurality of images;
    determining a first sunlight direction in a first image of the plurality of images and a second sunlight direction in a second image of the plurality of images;
    determining a sunlight error between the first sunlight direction and the second sunlight direction;
    selecting an image pair including the first image and the second image for analysis based on the image characteristics including the sunlight error;
    determining common points of interest in each image of the image pair;
    generating a modified image pair by modifying at least one image of the image pair to reduce error between the common points of interest in the image pair;
    determining one or more shapes in the modified image pair,
    wherein the one or more shapes are representative of an object geometry of an object in the modified image pair; and
    generating the environment model representative of the environment to include a representation of the object by the one or more shapes.

2. The method of claim 1,
    wherein the object is a man-made structure; and
    wherein the method further comprises:
        determining the one or more shapes based on a determined geometry of the man-made structure; and
        determining that the one or more shapes has a highest fitting quality of a plurality of candidate shapes.

3. The method of claim 1, further comprising:
    generating a digital surface model from the modified image pair for the environment model representative of the environment;
    determining vegetation in the modified image pair;
    determining vegetation characteristics from the modified image pair,
    wherein the vegetation characteristics comprise at least canopy size, canopy height, and material characteristics;
    matching a vegetation type to the vegetation characteristics from a stored database of vegetation types; and
    generating a representative vegetation model based at least in part on the vegetation type for the environment model representative of the environment.

4. The method of claim 3, wherein the representative vegetation model is a single generated plant, or a vegetation region covered with a representative plurality of plants.

5. The method of claim 3, further comprising:
    masking the representative vegetation model from the environment model representative of the environment; and
    generating a representative shape for structures obscured by the vegetation.

6. The method of claim 1, further comprising determining a type of material of the object from a digital surface model and at least one of a panchromatic image and one of a multi-spectral image or a red-green-blue image.

7. The method of claim 1,
    wherein the object is man-made,
    wherein the plurality of images is captured over a period; and
    wherein the method further comprises identifying the object in the plurality of images captured over the period.

8. The method of claim 1, wherein the one or more shapes are geons.

9. The method of claim 8, further comprising determining the one or more shapes by matching the one or more shapes to the object at various elevations by comparing fit qualities of one or more potential shapes at each elevation.

10. One or more non-transitory computer-readable media storing computer-executable instructions that, when executed by at least one processor, perform a method of generating an environment model representative of an environment, the method comprising:
    obtaining a plurality of images of the environment from one or more databases including satellite images;
    storing image characteristics associated with the plurality of images;
    determining a first sunlight direction in a first image of the plurality of images and a second sunlight direction in a second image of the plurality of images;
    determining a sunlight error between the first sunlight direction and the second sunlight direction;
    selecting an image pair including the first image and the second image for analysis based on the image characteristics including the sunlight error;
    determining common points of interest in each image of the image pair;
    generating a modified image pair by modifying at least one image of the image pair to reduce error between the common points of interest in the image pair;
    determining one or more shapes in the modified image pair,
    wherein the one or more shapes are representative of an object geometry of an object in the modified image pair;
    determining vegetation in the modified image pair;
    determining vegetation characteristics based on the vegetation in the modified image pair;
    generating a vegetation model based on the vegetation characteristics; and
    generating the environment model representative of the environment to include a representation of the object by the one or more shapes and the vegetation model.

11. The media of claim 10, wherein the plurality of images is captured over a period; and wherein the method further comprises identifying the object in the plurality of images captured over the period.

12. The media of claim 10, wherein the vegetation characteristics comprise at least material characteristics and elevation of the vegetation, and wherein the method further comprises:
   matching a vegetation type to the vegetation characteristics from a stored database of vegetation types for a region of the environment; and
   generating a representative vegetation model for the environment model representative of the environment.

13. The media of claim 10, wherein the method further comprises determining the object geometry by analyzing at least a shade on the object and material of the object.

14. The media of claim 13, wherein the object is a building, and the one or more shapes are fit to a roof of the building and any side of the building visible in the modified image pair.

15. The media of claim 13, wherein the method further comprises:
   determining a sun angle at a time that each image was taken; and
   determining the object geometry based at least in part on the sun angle and the shade.

16. One or more non-transitory computer-readable media storing computer-executable instructions that, when executed by at least one processor, perform a method of generating an environment model representative of an environment, the method comprising:
   obtaining a plurality of images of the environment from one or more databases including satellite images;
   storing image characteristics associated with the plurality of images;
   determining a first sunlight direction in a first image of the plurality of images and a second sunlight direction in a second image of the plurality of images;
   determining a sunlight error between the first sunlight direction and the second sunlight direction;
   selecting an image pair including the first image and the second image for analysis based on the image characteristics including the sunlight error;
   determining common points of interest in each image of the image pair;
   generating a modified image pair by modifying at least one image of the image pair to reduce error between the common points of interest in the image pair;
   determining one or more shapes in the modified image pair,
   wherein the one or more shapes are representative of an object geometry of an object in the modified image pair;
   generating a digital surface model from the modified image pair for the environment model representative of the environment; and
   generating the environment model representative of the environment to include a representation of the object by the one or more shapes and the digital surface model.

17. The media of claim 16, wherein the plurality of images is captured over a period; and
wherein the method further comprises identifying the object in the plurality of images captured over the period.

18. The media of claim 16, wherein the method further comprises:
   determining vegetation in the modified image pair;
   determining vegetation characteristics from the modified image pair,
   wherein the vegetation characteristics comprise at least canopy size, canopy height, and material characteristics;
   matching a vegetation type to the vegetation characteristics from a stored database of vegetation types; and
   generating a representative vegetation model based at least in part on the vegetation type for the environment model representative of the environment.

19. The media of claim 16, wherein the method further comprises determining the one or more shapes by matching the one or more shapes to the object at various elevations by comparing fit qualities of one or more potential shapes at each elevation.

20. The media of claim 16, wherein the object is a building, and the one or more shapes are fit to a roof of the building and any side of the building visible in the modified image pair.

* * * * *